(12) United States Patent
Kurtz

(10) Patent No.: US 9,057,422 B2
(45) Date of Patent: Jun. 16, 2015

(54) STRETCH BELT REMOVAL AND INSTALLATION TOOL

(71) Applicant: Lisle Corporation, Clarinda, IA (US)

(72) Inventor: Scotty R. Kurtz, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 248 days.

(21) Appl. No.: 13/729,792

(22) Filed: Dec. 28, 2012

(65) Prior Publication Data

US 2014/0141911 A1    May 22, 2014

Related U.S. Application Data

(60) Provisional application No. 61/728,589, filed on Nov. 20, 2012.

(51) Int. Cl.
*F16H 7/22* (2006.01)
*F16H 7/24* (2006.01)

(52) U.S. Cl.
CPC ........................................ *F16H 7/24* (2013.01)

(58) Field of Classification Search
CPC ....... F16H 7/24; B25B 27/0035; B25B 27/22; Y10T 29/53974; F16G 5/20
USPC ......................................................... 474/130
See application file for complete search history.

(56) References Cited

U.S. PATENT DOCUMENTS

| | | | |
|---|---|---|---|
| 2,121,129 A | 6/1938 | Malone | |
| 2,475,459 A * | 7/1949 | Pendleton et al. | 474/130 |
| 2,499,173 A | 2/1950 | Taylor | |
| 2,505,216 A * | 4/1950 | Simmons et al. | 474/130 |
| 2,615,345 A * | 10/1952 | Ross | 474/130 |
| 2,621,529 A | 12/1952 | Hawkins | |
| 2,913,915 A * | 11/1959 | Russ | 474/120 |
| 2,924,109 A | 2/1960 | Carriveau | |
| 3,138,963 A | 6/1964 | Prince | |
| 4,325,703 A | 4/1982 | Phillips | |
| 5,653,654 A * | 8/1997 | Davis | 474/119 |
| 6,402,649 B1 * | 6/2002 | Amkreutz | 474/130 |
| 6,453,717 B1 * | 9/2002 | Amkreutz | 72/379.2 |
| 6,565,467 B2 | 5/2003 | Amkreutz | |
| 6,692,391 B2 * | 2/2004 | Gerring et al. | 474/130 |
| 6,783,473 B2 * | 8/2004 | De Meester et al. | 474/130 |
| 7,048,663 B2 * | 5/2006 | Riaudel | 474/130 |

(Continued)

FOREIGN PATENT DOCUMENTS

| | | |
|---|---|---|
| EP | 1089016 A1 | 4/2001 |
| JP | 2007126078 A | 5/2007 |

(Continued)

OTHER PUBLICATIONS

Gates Products, Stretch Belt Installation Tool, KTI-70730, 8 pp.

(Continued)

*Primary Examiner* — Henry Liu
(74) *Attorney, Agent, or Firm* — Banner & Witcoff, Ltd.

(57) ABSTRACT

A unitary stretch belt installation and removal tool includes an installation component having a slot for positioning the tool on the rim of a pulley and a wedge shaped element to stretch and guide a belt into a pulley groove as the pulley is rotated and further having an integral removal component including a slot and a shaped, generally convex belt guide surface for stretching and guiding a belt from a pulley as the pulley is rotated.

4 Claims, 2 Drawing Sheets

(56) References Cited

U.S. PATENT DOCUMENTS

| | | | |
|---|---|---|---|
| 7,056,244 B2 * | 6/2006 | Hodjat | 474/130 |
| 7,335,121 B2 | 2/2008 | Fletcher et al. | |
| D577,968 S | 10/2008 | Siau | |
| 8,241,159 B2 * | 8/2012 | Iwata | 474/130 |
| 8,684,871 B2 * | 4/2014 | Mitchell | 474/130 |
| 2002/0107098 A1 * | 8/2002 | Amkreutz | 474/130 |
| 2002/0151397 A1 * | 10/2002 | Amkreutz | 474/130 |
| 2003/0176248 A1 * | 9/2003 | De Meester et al. | 474/130 |
| 2003/0211910 A1 * | 11/2003 | Gerring et al. | 474/130 |
| 2004/0002400 A1 * | 1/2004 | Ellis et al. | 474/130 |
| 2004/0063530 A1 * | 4/2004 | De Meester et al. | 474/130 |
| 2004/0248681 A1 * | 12/2004 | Riaudel | 474/130 |
| 2005/0164815 A1 * | 7/2005 | Winninger et al. | 474/130 |
| 2005/0170923 A1 * | 8/2005 | Hodjat | 474/130 |
| 2005/0221933 A1 * | 10/2005 | Shaw | 474/130 |
| 2005/0221934 A1 * | 10/2005 | Shaw | 474/130 |
| 2006/0009322 A1 * | 1/2006 | Fletcher et al. | 474/130 |
| 2008/0155803 A1 * | 7/2008 | Iwata | 29/281.4 |
| 2010/0048335 A1 * | 2/2010 | Debuire | 474/130 |
| 2010/0125995 A1 | 5/2010 | Fukatani | |
| 2010/0173737 A1 * | 7/2010 | Coirault et al. | 474/130 |
| 2010/0248878 A1 | 9/2010 | Maruyama et al. | |
| 2012/0040791 A1 * | 2/2012 | Mitchell | 474/119 |

FOREIGN PATENT DOCUMENTS

| | | |
|---|---|---|
| JP | 2009115150 A | 5/2009 |
| WO | 0236987 A1 | 5/2002 |
| WO | 200512766 A1 | 2/2005 |
| WO | 2008125461 A1 | 10/2008 |
| WO | 2010109088 A1 | 9/2010 |

OTHER PUBLICATIONS

Easily Install Stretch Belts on Late Model European Vehicles, , SBIT2, Snap-on, Jul. 6, 2010, 1 p.
Belt Tool Stretch, SBIT1, Snap-on, Oct. 28, 2010, 1 p.
Ford Motorcraft 303-1252 Strechy Belt Remover/Installer Tool Part No. ROT303-1252, Hands on Tools, Sep. 28, 2010, 1-2 pp.
Auxiliary Stretch Belt Removal/Installation Tool, Rapid Online, Oct. 28, 2010, 1-3 pp.
PBT Stretch Belt Mate Kit, Part No. 70990, 1 p.
OW7424 Belt Holding Tool, Cornwell Webcat, Oct. 4, 2012, 1 p.
Techlink: Jul. 2007 Archives—www.sandyblogs.com/techlink/2007/07/, 3 pp., Oct. 28, 2010.
Accessory Drive—Removal and Installation Power Steering Pump Belt, 2008, Ford Motor Company, 2009 Taurus, Taurus X, Sable, Nov. 2008, 2 pp.
Tools Offered by OTC, 5 pp.

* cited by examiner

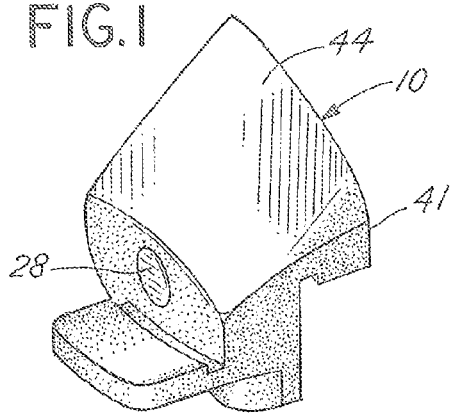
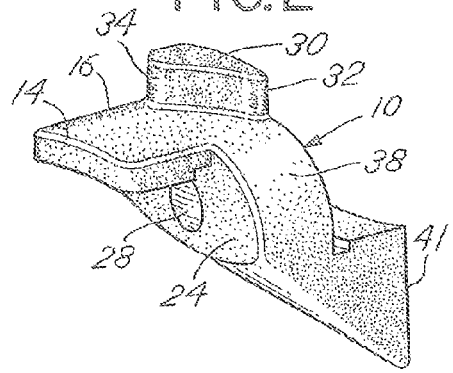
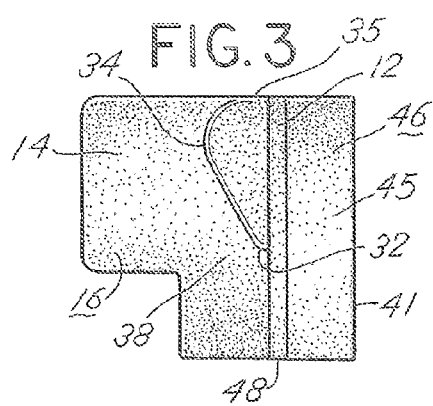
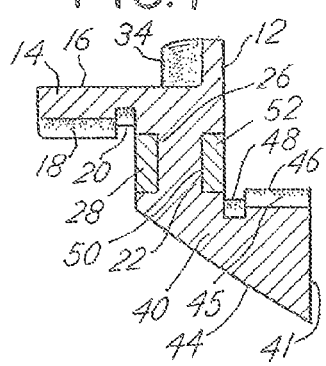
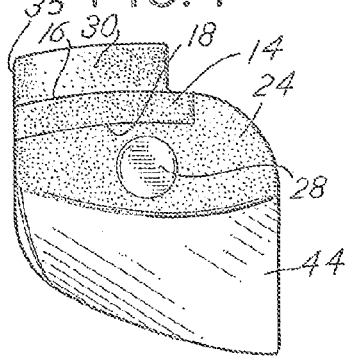
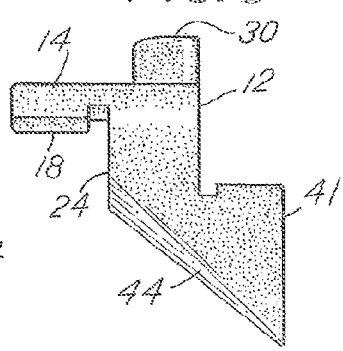
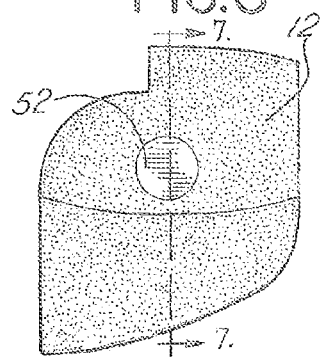

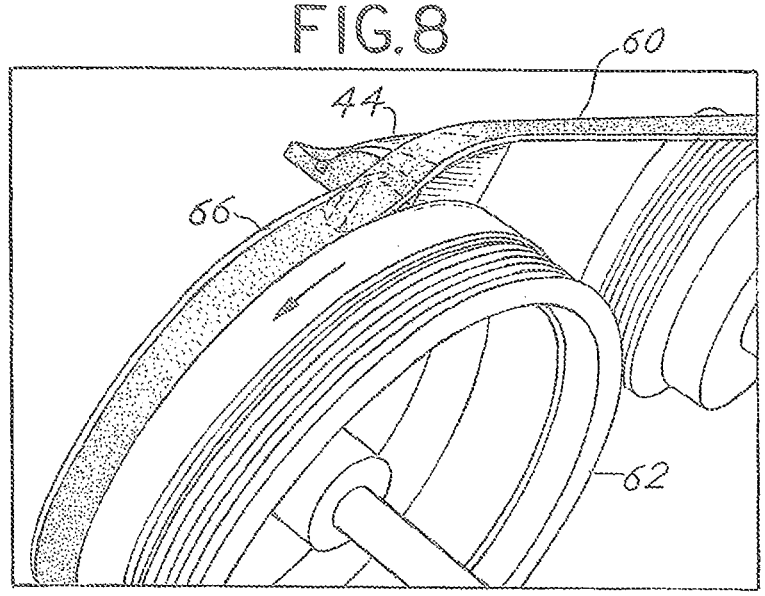
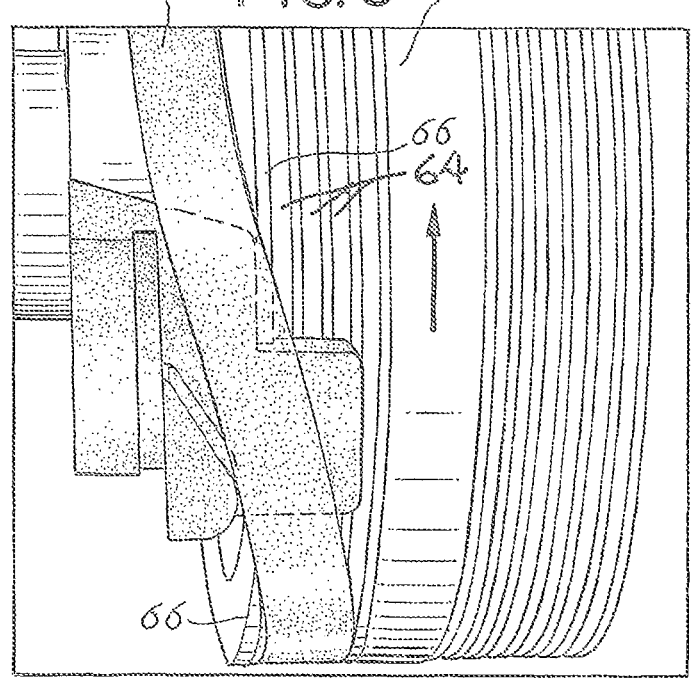

STRETCH BELT REMOVAL AND INSTALLATION TOOL

CROSS REFERENCE TO RELATED APPLICATIONS

This is a utility application incorporating by reference and claiming priority to provisional application Ser. No. 61/728,589 filed Nov. 20, 2012 entitled "Stretch Belt Removal and Installation Tool".

BACKGROUND OF THE INVENTION

Briefly the present invention relates to a tool for removal as well as installation of elastic, drive belt of the type utilized in various engine and machine applications such as in automobile engines which employ pulleys connected by a drive belt.

In recent years automotive manufacturers have introduced stretch drive belts in place of fixed length belts to connect pulleys which drive various automotive components such as water pumps, power steering pumps, air conditioner compressors and the like. Such components are typically driven by a belt which connects a drive pulley to one or more driven component pulleys. Heretofore, such belts were of a fixed length and would not stretch. Thus, idler rollers or belt tension pulleys were required to tighten the belts so that they could efficiently effect operation between a drive and a driven pulley.

The development and use of belts which stretch elastically when placed between drive and driven pulleys eliminates the need for idler rollers or other belt tightening mechanisms. Removal of belt tensioning devices provides various beneficial results including reduced weight of the motor vehicle and reduced cost of mechanisms to ensure efficient and appropriate operation of the components in the motor vehicle. In addition, the replacement of fixed length belts with stretch belts often leads to reduced cost of maintenance. For example, special tools and repair procedures are often required to replace prior art, non-stretchable, fixed length belts.

The introduction of stretch drive belts has, however, presented a problem of effecting appropriate stretching of belts for removal from pulleys connected by such belts and for installation of such belts. Various proposals have been made and various tools have been suggested to effect removal or installation of the belts. Typically a special tool is required to remove a belt from a set of pulleys and a separate tool is required to install a belt on pulleys. Thus, the availability of a universal tool of simple and unique construction to effect both installation as well as removal of an elastic or stretch belt has remained a desired tool for automotive repair and for use in other circumstances where stretch belts are utilized to drive mechanical components.

SUMMARY OF THE INVENTION

In a principal aspect the present invention comprises a unitary, integral tool which can be used to easily remove a stretch drive belt as well as to install a stretch drive belt on pulleys. The tool is comprised of a unitary wedge device which incorporates two basic component sections. One of the sections is utilized to remove a drive pulley belt. The second section is utilized to install such a belt. The two separate sections are formed as a single or unitary device.

The installation component or element includes a generally a first flat, planar wall with a transverse platform section extending from that first wall. The platform section includes a generally flat or slightly arcuate top surface portion with a wedge element extending upwardly from the flat top surface portion. One side of the wedge element is comprised of the first wall and the other side forms an acute angle with the first wall. The wedge element is thus bounded on one side by the first wall with the platform top surface extending laterally from the other side of the wedge element and extending arcuately therefrom.

The transverse platform includes a bottom surface spaced downwardly from the top surface portion. The bottom surface includes a first slot generally parallel to the first wall and spaced from the first wall. The first slot is bounded on one side by a second wall generally parallel to the first wall and transversely spaced from the first wall. A first pulley groove insert element is formed in the bottom surface on the other side of the first slot and spaced from the first and second walls to define the first slot. The first pulley groove insert element as well as the first slot may be arcuate to facilitate positioning and engagement of the tool with a pulley rim and associated pulley groove.

To install a drive belt, the first slot is positioned onto the rim of a pulley with the pulley groove insert element positioned in the associated pulley groove. The tool is positioned so that the wedge element is placed against the side of a drive belt and the underside of the belt is positioned against the top surface portion of the platform. The pulley may then be rotated to stretch and guide the stretch drive belt over the installation component top surface portion directed by the wedge element into the groove of the pulley. The installation component may include a magnetic element in the wall adjacent the slot which is positioned against the rim of the pulley to maintain the wedge tool in position as the pulley wheel is rotated to guide the pulley drive belt onto the pulley.

The other or second component of the tool is incorporated on the side of the tool opposite from the installation component of the tool. The second or belt removal component is used to remove a stretch drive belt from a pulley. Thus, the removal component or element includes a guide member located on the tool and extending in the opposite direction from the installation wedge element. The guide member includes a guide surface that is generally convex and may be fitted against the underside of a drive belt to stretch the belt and thereby enable removal of the belt from the pulley. The component for removal also includes a second guide slot and second pulley groove insert in a guide block section of the tool which extends from the plane of the first wall. This ensures that the tool will remain properly engaged with a pulley as the pulley is turned manually or by means of some drive. The removal component thus includes the second drive slot which fits on the rim of a pulley as well as a second pulley groove insert which fits within the groove of the pulley to ensure that the removal component remains in a desired position during use. To further facilitate the maintenance of placement of the removal component, a magnet may be included in the face of the removal component which is opposed to the rim of the pulley.

The installation component and the removal component of the tool are incorporated in a single unitary member and, depending upon the position of the engagement thereof with the rim of a pulley, will serve to either facilitate installation of or removal of a stretch drive belt on or from a pulley as that pulley is rotated.

Thus, it is an object of the invention to provide an improved stretch drive belt removal and installation tool.

A further object of the invention is to provide a shaped stretch drive belt installation and removal tool incorporated into a single element.

Another object of the invention is to provide a simple, yet very efficient, inexpensive, rugged and easy to utilize tool for the installation as well as the removal of a stretch drive belt from a pulley.

These and other objects, advantages and features of the invention are set forth in the detailed description which follows.

BRIEF DESCRIPTION OF THE DRAWING in the detailed description which follows reference will be made to the drawing comprised of the following figures:

FIG. 1 is an isometric view of an embodiment of the invention depicting the unitary wedge tool of the invention wherein the surface of the pulley removal component is displayed;

FIG. 2 is an isometric view of the unitary wedge shaped tool of an embodiment of the invention wherein the pulley installation component of the invention is depicted;

FIG. 3 is a top plan view of the tool shown in FIG. 2;

FIG. 4 is a side elevation of the left hand side of the tool viewed in FIG. 3;

FIG. 5 is a vertical plan view of the tool depicted in FIG. 3;

FIG. 6 is a side elevation of the tool depicted in FIG. 5;

FIG. 7 is a cross sectional view of the tool depicted in FIG. 6 taken along the lines 7-7;

FIG. 8 is a pictorial view of the tool illustrating use for removal of a stretch drive belt; and FIG. 9 is a pictorial view of the tool illustrating use for installation of a stretch drive belt.

DETAILED DESCRIPTION OF EMBODIMENTS OF THE INVENTION

Referring to the Figures, the stretch belt installation and removal tool is comprised of two basic sections or component parts which are integrated as a unitary element. FIG. 7 depicts, in general, the separate component sections. Referring to FIG. 7 and the remaining related figures, the tool 10 includes a first generally flat, planar outer wall 12. The plane of the flat, planar outer wall 12 represents a general demarcation between the installation tool or component and the removal component of the tool though the components are integrated into a single tool and parts thereof overlap.

In FIG. 7 the elements or features to the left of the first flat, planar wall 12 and the extension thereof generally comprise the installation component. To the right of the flat, planar outer wall 12 and including the features of the flat, planar outer wall 12 there is generally depicted the removal component.

The installation component comprises a belt support section 14 which is generally transverse to the wall 12. Support section 14 includes a first belt or upper support surface 16 which is slightly arcuate and is also generally transverse to the first outer wall 12. The support section 14 further includes a generally arcuate, lower pulley engagement insert or element 18 generally parallel to surface 16 and spaced from first wall 12 with a first arcuate slot 20 positioned between a second, generally flat planar pulley rim attachment wall 24 which is generally parallel to the first wall 12. The flat, planar wall 24 includes a counterbore 26 which receives a magnet 28. The region or subsection 22 between first wall 12 and second wall 24 is a feature of the installation component and belt removal component of the tool.

Positioned on and extending upwardly from the support surface 16 is a belt wedge guide section or element 30. The wedge guide element 30 includes a leading edge 32. The wedge element or wedge 30 expands between the leading edge 32 and back side 35 of the pulley support surface 16. The wedge or wedge section 30 is thus bounded by first wall 12 and an opposite wedge wall 34 which diverges to form an acute angle with leading edge 32 at the apex of the angle. The belt support surface 16, in combination with the upper side of the rim engagement subsection 22 as depicted in FIG. 2 defines a generally arcuate composite face 38 which serves, at least in part, as a guide for and to stretch an elastic pulley drive belt as will be detailed below.

With respect to the belt removal component of the unitary tool 10, reference is made to the right hand side of FIG. 7. The right hand side includes a guide block section 40 which is formed between second wall 24 and a third outside wall 41 that is generally parallel to the first wall 12 and second wall 24. A generally convex surface 44 is formed on the lower end or face of the guide block 40. The convex surface 44 is a compound curve in the embodiment depicted wherein the radii associated with the elements of the curved surface 44 extend to the right hand side of FIG. 7. The convex surface 44 serves as a guide to stretch a stretch drive belt which will slide over that surface 44 when used as described in more detail hereinafter.

The guide block 40 includes a pulley support face 46 with a rim insert 45 with a second rim engagement and guide slot 48 between the rim insert 45 of support face 46 and the flat, planar wall 12. Second, guide slot 48 is adjacent the flat, planar wall 12, is generally parallel to the first guide slot 20, has generally the same configuration and size as the first guide slot 20 which, as depicted in the figures, is slightly arcuate.

The flat, planar wall 12 further includes a counterbore 50 with a mounted magnetic element 52. The magnetic element 52 as well as the second slot 48 and the support face 46 in combination with the surface 44 comprise the removal component which engages with a stretch drive belt to stretch the belt for removal purposes and to also guide the belt during removal.

FIGS. 8 and 9 illustrate respectively use of the removal and installation tool to effect removal and installation of a stretch drive belt 60 and from and on a pulley wheel 62. Referring to FIG. 8 therefore, drive belt 60 may be removed from a pulley wheel 62 by placement of the removal component in the manner shown wherein the convex surface 44 is fitted on the underside of the belt 60. Simultaneously, the outer wall 12 is fitted against the outside rim 66 of the pulley 62 and the insert 45 of support face 46 is fitted into a groove 64 of the pulley wheel 62 with the pulley rim 66 fitted into second slot 48. The pulley wheel 62 may then be rotated in the direction of the arrow in FIG. 8 to stretch the belt 60, direct the belt 60 from the pulley 62 and thereby effect ease of removal of the belt 60 as the wheel or pulley 62 is turned.

To effect installation of a stretch drive belt 60, the tool is positioned as depicted in FIG. 9 with the first slot 20 fitted over rim 66 so that the insert 18 may be fitted into groove 64 of the pulley 62. The wedge 30, namely side or wall 34, is fitted against under side of belt 60. The belt 60 is initially, at least in part, is loosely positioned for engagement with the pulley 62. The pulley 62 may then be rotated in the direction of the arrow in FIG. 9 and as the pulley 62 moves over the surface 38, the belt 60 will be stretched and guided by and into engagement with pulley 62. In this manner the belt 60 is directed into the grooves 64 of pulley 62 as it is stretched over surface 16 as the pulley 62 is rotated. The magnets 28, 58 as the case may be, help retain the tool in position on the rim 66 and pulley 62.

Various modifications may be incorporated in the tool. For example, multiple slots may be included in the tool to cooperate with various types and sizes of pulleys. The dimensional characteristics of the tool may be varied depending upon the size and dimensional characteristics of the pulleys and the belts. The arrangement and the specific configuration of the elements such as the wedge guide 30 and the convex surface 44 may be varied. The use of various types of magnetic material to facilitate maintenance of the tool in position on a pulley may be varied or the tool may be fabricated from a magnetic material. The tool may be formed of magnetic material. Thus, the embodiment as described is merely exemplary and the invention is to be limited only by the following claims and equivalents thereof.

What is claimed is:

1. A tool for installing a stretch drive belt and for removing a stretch drive belt from a pulley comprising:

a unitary pulley engaging member for placement intermediate a stretch belt and a pulley wheel, said pulley wheel including an outer circumferential rim and a circumferential groove for receipt of a stretch pulley drive belt adjacent the circumferential rim said tool including:

(a) a pulley belt installation component comprised of a first, generally flat, planar outer wall, a belt support and engagement section extending in a first direction transversely from said first wall, said belt support section comprising a generally planar, elastic belt, support surface generally transverse to said first wall, said belt support section further including a generally wedge shaped guide projecting from said belt support surface, said wedge shaped guide having a leading edge generally aligned with said first wall and a guide face diverging from said leading edge and away from said first wall; said belt support section further including a rim support surface generally, at least in part, parallel to and spaced from said belt support surface; a pulley rim engagement section extending from said belt support and engagement section in a direction generally opposite to the projecting direction of said wedge shaped guide, said pulley rim engagement section including a second generally flat planar wall, generally parallel to and transversely spaced from said first wall in said first direction; said belt support section pulley support surface including a slot generally parallel to said second wall and adjacent said second wall for receiving a rim of a pulley; and (b) an integral pulley belt removal component comprising a transverse, unitary extension of said pulley rim engagement section and extending in a transverse direction opposite said first direction; said pulley rim engagement section and extension forming in combination a shaped and curved belt guide removal surface diverging from said second wall in a direction opposite said first direction; said pulley rim engagement section and extension including a third wall transversely spaced from said first wall in the direction of the diverging belt guide removal surface, said pulley rim engagement section and extension including a second rim support surface generally parallel to said first rim support surface, said second rim support surface extending in the opposite direction from said first support surface, said second support surface including a second slot generally parallel to the first slot and adjacent the first wall.

2. The tool of claim 1 further including a magnetic element in at least one of said first and second walls.

3. The tool of claim 2 including a magnetic element in each of said first and second walls.

4. The tool of claim 1 wherein the first slot and the second slot have a width for placement of said slot over and on a pulley rim.

\* \* \* \* \*